June 14, 1927.
W. C. MARTIN
TIRE
Filed Feb. 20, 1922　　　2 Sheets-Sheet 1
1,632,489
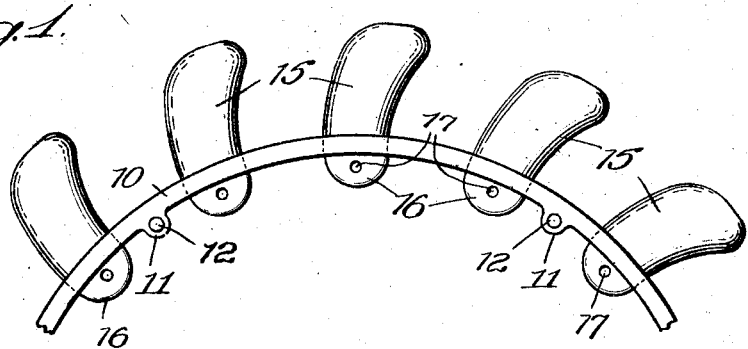
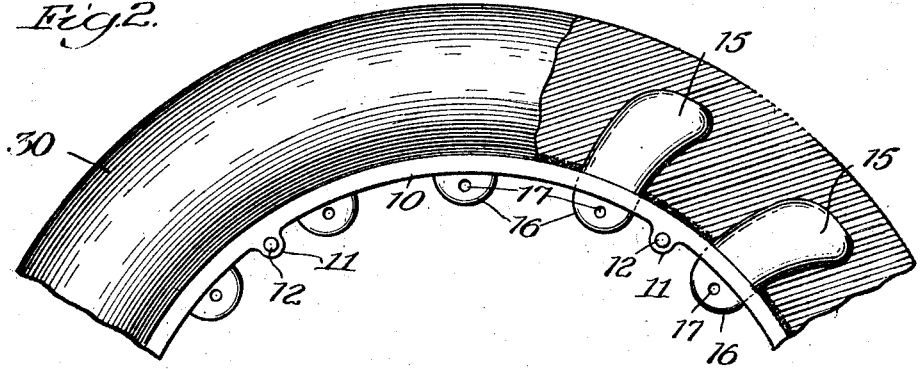
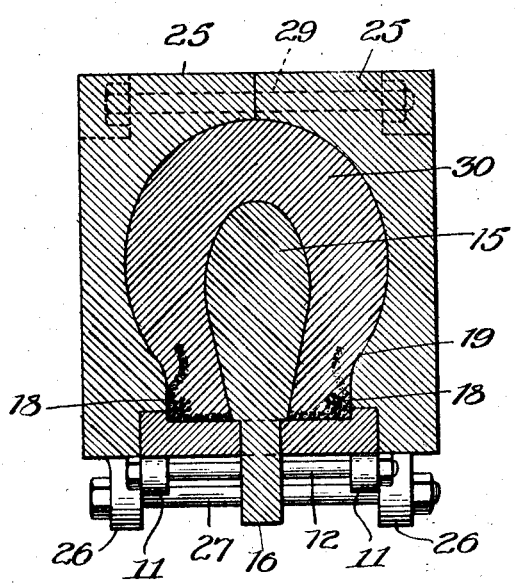
Inventor:
William C. Martin,
By Dyrenforth, Lee, Chritton & Wiles
Attys.

June 14, 1927.  
W. C. MARTIN  
TIRE  
Filed Feb. 20, 1922     2 Sheets-Sheet 2

1,632,489

Inventor:
William C. Martin,
By Dyrenforth, Lee, Chritton & Wiles,
Attys.

Patented June 14, 1927.

1,632,489

UNITED STATES PATENT OFFICE.

WILLIAM C. MARTIN, OF CHICAGO, ILLINOIS.

TIRE.

Application filed February 20, 1922. Serial No. 537,912.

This invention relates to improvements in vehicle tires. The invention relates more particularly to a rubber vehicle tire provided with air cells to add resiliency.

Figure 4:
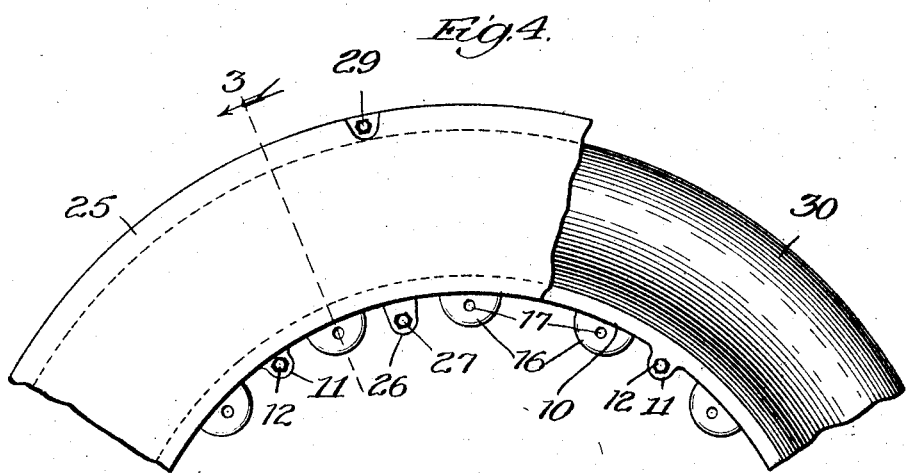
Figure 5:
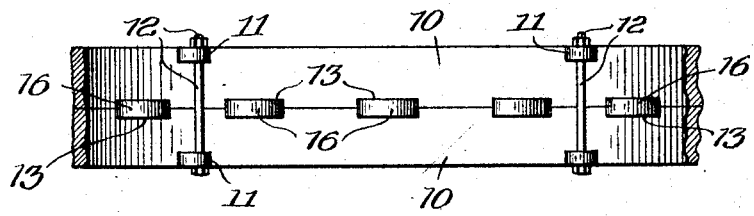
Figure 6:
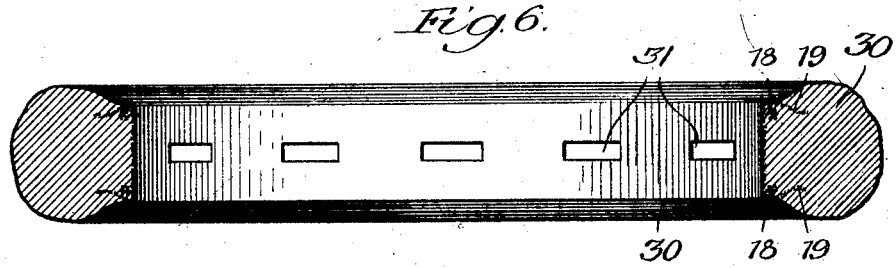
Figure 7:
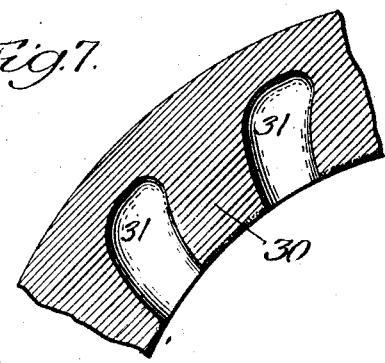

The invention will be fully understood by reference to the following specification and accompanying drawings, in which Figure 1 is a view in side elevation of the cores around which the tire is molded, showing also the mandrel rings by which said cores are supported, Fig. 2 is a similar view, partly in vertical section showing the tire molded around the cores, Fig. 3 is a vertical sectional view showing the mold in place, Fig. 4 is a similar view in side elevation with a part of the mold broken away disclosing the tire, Fig. 5 is a bottom plan view of a part of the mandrel rings which support the cores, Fig. 6 is a bottom plan view of a part of the completed tire, and Fig. 7 is a similar view in vertical section.

As shown in the drawings, 10, 10 indicate two rings provided with lugs 11, adapted to be engaged by bolts 12 to hold the rings tightly together. Each of the rings 10 is provided with a series of rectangular notches 13. These notches are adapted to register when the rings are together to form the rectangular openings, which will also be indicated by 13. 15, 15 indicate cores, which may be made of cast iron or any suitable material. These cores are substantially shoe-shaped but slightly curved, each having a tongue 16 on one end provided with a hole 17. The tongues 16 are just large enough to fill the rectangular openings 13 and to be gripped therein when the rings 10 are bolted together.

In making the tire, the rings 10 are bolted together with the cores 15 in place, as shown in Fig. 1. The wire beads 18 and strips of fabric 19 are then put in place, and rubber stock is placed between and over the cores 15 to form the tire in the proper shape, as shown. The mold is then placed over the rubber. This mold is then subjected to heat and pressure to accomplish the necessary vulcanizing and treating of the rubber to make the completed tire. This mold is formed of two halves, indicated by 25, 25, as shown, provided with lugs 26 adapted to accommodate bolts 27 to hold the two parts of the mold together. Additional bolts 29 are provided near the outer periphery to assist in holding the two parts together. After the tire has been properly vulcanized and properly treated, the two halves of the mold are removed. The two rings 10, 10 are then removed. This leaves the completed tire with the cores 15 still in place. These cores are removed by placing a suitable hook in the hole 17 and forcibly pulling the cores out, thus leaving the air cells 31 in the completed tire 30. In pulling the cores out, the rubber will spread to permit their withdrawal.

It will be noted that the rings 10 form a foundation or base on which the skeleton of the tire is formed. Also that the fabric 19 is provided with a series of slots through which the base portions of the cores 15 extend, as will be observed in Figs. 2 and 3. Also, as illustrated in Figs. 3 and 6, the edge portions of the fabric are bent outwardly from the foundation rings 10 and are disposed between the pieces of rubber, so that when the tire is vulcanized the out-turned margins are vulcanized in the rubber and firmly anchored therein, as may be readily understood from Fig. 3. Also, as will be understood from Fig. 3, the base of the tire affords what is known as the straight-faced sides or flanges which are gripped between the flanges of the rim on the wheel when the tire is mounted on the rim. Thus, the tire is adapted to take the place of an ordinary pneumatic tire.

It will be noted that rubber walls between the air cells provide suitable anchors to secure the tire to the rim, and also serve as driving or traction arms engaging both the rim and the carcass of the tire on the inside circumference. These walls also provide resiliency in addition to the air cells. It is also to be noted that the cells with their dividing walls are curved. The tire should be preferably put on the wheel so that when it is in running motion it will run with the curve of the walls. It is not absolutely necessary, however, that the tire always run in one direction.

It will be noted that the openings of the air cells are adjacent the rim when the tire is in place. It will be seen, therefore, that the rim covers such openings, thus confining the air therein.

It may be stated that the tire is essentially an integral solid rubber tire having the air cavities as described; also, the fabric 19 extends across the inner cylindrical circumferential surface of the tire and has its margins turned outwardly and embedded in the vulcanized rubber. It will be understood therefore that the inner cylindrical circumferential surface of the tire extends to or intercepts the planes of the lateral surfaces of the base of the tire; also, the out-turned margins of the fabric afford reinforcements flanking the inner end portions of the air cells and intervening rubber-sections. This feature is of importance in a transmission of traction-stresses from the road to the rim of the vehicle wheel.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A molded integral solid rubber tire having a base-portion adapted to fit between the flanges of a tire rim and having a cylindrical inner surface extending to the lateral surfaces of the base; said tire containing air cells at intervals open at the inner circumference of the tire and adapted to be covered by the rim, said base-portion having a fabric vulcanized thereto and provided with slots registering with said air cells and having out-turned margins embedded and vulcanized in the rubber forming the body of the tire.

2. A molded integral solid rubber tire having a base-portion adapted to fit between the flanges of a rim and having air cells at intervals open at the inner circumference of the tire and adapted to be covered by the rim, said cells being curved backwardly, and said base-portion having a cylindrical inner wall extending to the lateral surfaces of the base and said base-portion being built upon a fabric vulcanized thereto and having margins extending into and vulcanized in the rubber forming the body of the tire, said fabric having slots therein registering with said air cells.

Witness my hand this 18 day of February, 1922.

WILLIAM C. MARTIN.